Oct. 20, 1964    C. E. SCHROEDER    3,153,716
METHOD FOR JOINING CERTAIN METALS WHICH SPONTANEOUSLY
REACT WITH ATMOSPHERIC ELEMENTS
Filed Nov. 20, 1961

INVENTOR.
CARL E. SCHROEDER
BY
ATTORNEYS

३,१५३,७१६
METHOD FOR JOINING CERTAIN METALS WHICH SPONTANEOUSLY REACT WITH ATMOSPHERIC ELEMENTS
Carl E. Schroeder, Ponca City, Okla., assignor to Continental Oil Company, Ponca City, Okla., a corporation of Delaware
Filed Nov. 20, 1961, Ser. No. 153,585
6 Claims. (Cl. 219—9.5)

This invention relates to a method for joining, by welding and the like, two metallic members, at least one of which is subject to spontaneous and substantially instantaneous reaction at its surface with atmospheric elements. More particularly, but not by way of limitation, the present invention relates to a method for welding readily oxidizable metals such as aluminum, titanium and the like.

The property of certain metallic elements such as aluminum and titanium to undergo rapid and spontaneous oxidation upon exposure to the atmosphere is well-known. This characteristic of these elements and their alloys presents a not inconsiderable problem in efficiently welding such metals to each other, or to other metals. The difficulties which are experienced in welding such materials stem in a large degree from the high and erratic electrical resistance of the surface oxide coating which is formed as a result of their exposure to the atmosphere. Thus, for example, the electrical resistance properties of the oxide coating affect the amount of heat which is produced in the metal in the area of the weld during the welding process so that a wide variation occurs in the strength of such welds unless the oxide coating is removed by thoroughly cleaning the base metal prior to welding. Additionally, the oxide film, if improperly removed, can contaminate and weaken the weld joint. Because of the higher electrical resistance of the oxide coating, considerably higher welding temperatures are required to achieve the desired weld when insufficient cleaning of the metal surfaces has preceded the welding process. The requirement for high welding temperature is further engendered by the much higher melting point of the oxide film than that of the pure base metal. For example, aluminum oxide commences to melt or break down at about 3600° F., whereas aluminum and most aluminum alloys melt in the range of between 890° F. and 1215° F.

Numerous attempts have previously been made to assure that the surfaces of oxidizable metal articles which are to be subjected to a welding process are thoroughly cleaned to remove the surface oxide coating and numerous precautions have been taken to prevent the reformation of the oxide surface film prior to the completion of the weld. One of the best known techniques employed for preventing contamination of the surface of oxidizable metals during the welding process is that of inert atmosphere welding. By this procedure, the previously cleaned surfaces of the abutting metals which are to be welded to each other are thoroughly blanketed with an inert gas to the exclusion of atmospheric gases during the welding process. In this way, contact of oxygen with the surface of the metals to be welded until the welding has been completed is prevented.

Despite the realization of some advantage in preventing undesirable surface oxidation by the employment of inert atmosphere welding techniques, the problems hereinbefore described have persisted. To a large extent, this has been due to the fact that the obtainment of an entirely oxide-free welding surface prior to blanketing the surface with the inert gas has not been possible. Thus, for example, even though aluminum or titanium metallic members to be welded are thoroughly cleaned prior to placing them in the inert atmosphere preparatory to welding, formation of the oxide coating is sufficiently rapid that the slightest time delay in blanketing the metals with the inert gas permits the undesirable oxide to form. The time delay is necessarily greater in some situations, such as in the construction of aluminum pipeline where the welding must be accomplished in the field. Not only is the prevention of the surface oxidation of the aluminum between the time of cleaning and the time of welding extremely difficult in such field welding situations, but the provision of apparatus suitable for providing the necessary inert gaseous atmosphere has not been considered justified in view of the limited advantage obtained in that situation. Moreover, because of the extremely high temperatures which have been required to weld aluminum materials which are characterized in having an oxide film at the surface thereof, a prevalent practice employed heretofore to accomplish such welding has been to use a high temperature arc which is capable of melting the oxide coating, and of cleansing the base metal to some extent by flotation removal of slag produced in the welding process. The use of high frequency induction welding, on the other hand, with its known advantages over the arc welding procedure, has been substantially excluded by virtue of the undesirable thermal and electrical properties of certain metallic oxide surface coatings.

The welded joints which are obtained by the arc welding procedure when an oxide film or coating is initially present leave much to be desired since the oxide film over and around the joint prevents an accurate determination of flaws in the joint by means of X rays, and, as has previously been pointed out, the structural strength of the joint is nearly always substantially lower than that of the metal of the members which are welded to each other. Moreover, the higher welding temperatures which are required by reason of the presence of the oxide film increase the quantity, and therefore the expense, of the electrical current required, and decrease the safety with which such welding operations can be conducted.

The present invention contemplates an improved process for joining metals which are characterized by their ability to combine substantially instantaneously with atmospheric elements to form a thin coating of reaction product at the surface thereof. The basis of the improvement resides primarily in the suppression or total prevention of any recombination of such metals with atmospheric oxygen after the area to be welded has been thoroughly cleaned to remove the pre-existing oxide coating or film. In its broadest aspect, the invention comprises the steps of immersing the portion of the metallic member which is to be welded, brazed or otherwise joined to another piece of metal in a body of molten metal which, though solid at room or ambient temperatures, is characterized by a relatively low melting point; then thoroughly cleaning such immersed portion to remove the surface coating or film which has been previously formed thereon; and, finally, cooling that portion of the molten metal which is in contact with the cleaned portion of the metallic member until it solidifies thereon to form a protective sheath or coating on the metallic member. In this manner, the metallic member has that portion thereof which is to be subjected to the joining process completely and permanently protected from contact, and therefore chemical combination, with atmospheric elements.

The procedure of the invention, however, does not reside execlusively in the above-described novel method of cleaning and protecting the portion of the metallic members which are to be joined. I have also found that this novel cleaning and sheathing technique is especially well adapted for utilization in conjunction with inert atmosphere welding and brazing procedures. Thus, by using a relatively low melting metallic composition, such as solder, as the coating medium, this coating may easily and quickly be removed in the course of the welding operation by virtue of the high temperatures brought to bear during the welding process. As the metallic coating melts and gravitates from the metallic member or members to be welded, these members are blanketed with an inert gas to the exclusion of the atmospheric gases. No opportunity is thus afforded for the clean-surfaced base metal to recombine with atmospheric gases.

Since the necessity then exists for melting only the lower-melting, pure base metal in order to effect the weld, and the much higher-melting, oxide coating does not interfere, lower maximum welding temperatures are required. High frequency induction welding can be used very effectively and to considerable advantage over electric arc welding in many situations. The process is of particular advantage in the construction of aluminum pipeline in the field. Here, after the sections of aluminum pipe are cleaned and protectively coated or sheathed in the manner described above, these sections may be joined in end-to-end relation by induction welding during which the pipeline joints to be welded are continually blanketed with inert gas.

From the foregoing discussion, it will be apparent that a major object of the present invention is the provision of an improved process for welding readily oxidizable metals so that the detrimental effect of surface oxide films may be minimized or avoided.

Another object of the present invention is the provision of a method for electrically welding aluminum and aluminum alloys at lower welding temperatures and lower electrical current requirements.

An additional object of the invention is to provide an economical and otherwise practical method for induction welding aluminum pipe sections in the field.

A further object of the present invention is to improve existing methods of welding aluminum and other readily oxidizable metals in an atmosphere of inert gas.

A more specific object of the present invention is to improve the strength of welded joints obtained in welding aluminum and other readily oxidizable metals.

Another object of the invention is to improve the uniformity and consistency of the properties obtaining throughout the entire welded area of a welded aluminum member.

Another object of this invention is to provide novel sections of aluminum pipe which may be easily and effectively induction welded to each other in the field in the construction of aluminum pipeline.

Another object of this invention is to provide an improved method for cleaning the surface of a readily oxidizable member preparatory to welding the member to another metallic member.

Other objects and advantages of the present invention will become manifest upon conjunctively reading the following detailed description and perusing the accompanying drawings which schematically illustrate apparatus which may be used in performing the method of my invention.

Figure 1:
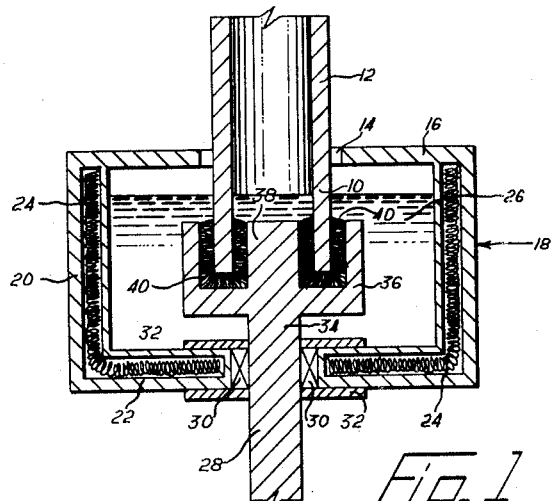
FIGURE 1 is a schematic vertical sectional view of a suitable apparatus which may be utilized for cleaning and protectively coating tubular members of readily oxidizable metals in order to remove the surface oxide coating therefrom preparatory to welding such members.
Figure 2:
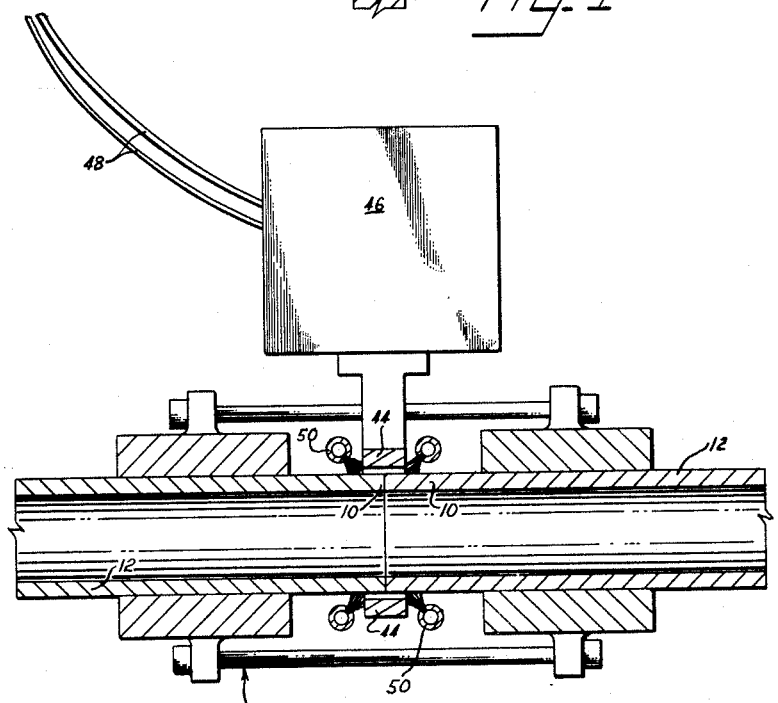
FIGURE 2 is a schematic view in partial section of a suitable field induction welding apparatus which may be used to weld sections of pipe cleaned and prepared for welding in accordance with the process of the present invention.

The accompanying figures are merely diagrammatically illustrative of suitable apparatus which may be used for the performance of the process of the invention. Other forms of apparatus can also be used to practice the invention, and, of course, to some extent, apparatus structural requirements will be dictated by the geometric configuration of the metallic member which is to be subjected to the inventive process. Thus, for example, although FIGS. 1 and 2 illustrate apparatus adapted for use in cleaning, coating and welding tubular sections of oxidizable metals, such as in the construction of pipelines from such metals, it will be apparent that such apparatus can be slightly modified as necessary when the welding of sheets, bars or blocks of such metals is contemplated.

Turning now to a description of the invention as it may be practiced using the illustrated apparatus, let it first be assumed that it is desired to construct a pipeline of a readily oxidizable metal such as aluminum. In the construction of such pipelines, it is the practice to join in contiguous end-to-end relation, a plurality of sections of aluminum tubing. The joinder of such sections is accomplished by welding the end of one section to the abutting end of the adjacent section.

According to the process of the present invention, the end portion 10 of each tubular section 12 of the aluminum piping is initially inserted through an opening 14 in the top 16 of a container or vat 18. The vat 18 has hollow side walls 20 and a hollow bottom 22 in which are located suitable electrical heating elements 24. Contained within the vat 18 is a molten metal or metallic composition 26 of relatively low melting point. The metal or metallic composition 26 should, however, possess a melting point higher than ordinary room or ambient temperatures. Most solder compositions are well suited for use as the metallic composition since they are characterized by relatively low melting points and adhere readily to the surface of the metallic member which is to be welded.

A shaft 28 extends upwardly through the bottom 22 of the vat 18 and is rotatably journaled in the bottom by means of suitable bearings 30. High temperature sealing elements 32 are provided around the shaft 28 on each side of the bottom 22 to prevent the egress of the molten metal from the vat by seepage around the shaft. At its upper end 34 located inside the vat 18, the shaft 28 is provided with a cup-shaped member 36 which is of substantially larger diameter than the outside diameter of the metallic tubular section 12. A projection 38 which is small enough to fit with considerable clearance inside the tubular section 12 is coaxially aligned with the shaft 28 and projects upwardly from the center of the cup-shaped member 36. A number of steel wire bristles 40 or other suitable brush elements project inwardly from the internal wall of the cup-shaped member 36 and outwardly from the outer periphery of the projection 38 a sufficient distance to insure engagement with the inner and outer peripheries of the tubular section 12. It will also be noted that additional bristles 40 are secured to the bottom of the cup-shaped member 36 in an upwardly extending position. These latter bristles function to clean the end face of the tubular section 12.

From the foregoing description of FIG. 1, it will be apparent that, after the end portion 10 of the tubular section 12 is inserted through the opening 14 in the top 16 of vat 18, the shaft 28 is moved upwardly to bring the cup-shaped member 36 over the end portion 10 of the tubular section. Rotation of the shaft 28 is then commenced by means of a suitable mechanical linkage to a driving element (not shown) and the steel wire bristles 40 commence to polish the end portion 10 of the tubular section 12. The arrangement of the bristles is such that the inner, outer and end surfaces of the end portion 10 of the tubular section 12 will be contacted by the bristles and thoroughly cleaned.

After the scrubbing action of the bristles 40 has been continued for a sufficient period of time to assure the complete removal of the oxide coating from the end portion 10 of the tubular section 12, rotation of the shaft 28 is discontinued and the shaft is lowered to remove the end portion 10 of the tubular section 12 from inside the cup-shaped member 36.

The next operation which is performed in the practice of the present invention is the sheathing or coating of the end portion 10 of the tubular section 12 with a layer of the metallic composition 26 which is contained in the vat 18. In order to accomplish such sheathing, the temperature of the molten metallic composition 26 in the vat 18 is lowwered to slightly above the melting point of the composition. In this regard, it will be apparent, of course, that the heating elements 24, located in the hollow walls and bottom of the vat 18 are connected to suitable controls (not shown) which permit the temperature of the molten contents of the vat to be varied. After the molten metallic composition 26 in the vat 18 has been lowered to a temperature slightly above its melting point, the tubular section 12 is withdrawn from the vat 18 so that the molten metal which is retained thereon by capillary attraction is immediately subjected to the much lower temperature of the surrounding atmosphere. This results in the immediate solidification of the metallic composition 26 upon the end portion 10 of the tubular section 12. No opportunity is provided for the clean surfaces of the end portion 10 to come in contact with the atmosphere, as the metallic composition 26 forms a protective sheath on the end portion 10 which, aside from cracking due to mechanical shock, or intentional removal by abrasion, will protect the surfaces of the end portion until the metallic composition is subsequently removed by reliquefaction. The tubular section 12 of readily oxidizable metal has now been prepared for subsequent utilization in welding, brazing, or otherwise subjecting its end portion 10 to some type of operation which may be more efficiently performed in the absence of an existing coating or film of oxide upon such end portion.

As has been previously indicated, the steps of cleaning and coating readily oxidizable metals hereinbefore described are particularly useful when combined with the further steps of welding metals so prepared by using inert gaseous atmosphere welding techniques. The manner in which such inert gaseous atmosphere welding techniques may be utilized for the construction of a pipeline from tubular sections prepared in accordance with the foregoing description is illustrated in FIG. 2. In this figure, a mobile induction welding unit of the type described in the September 28, 1958, issue of "Chemical Engineering" on page 96 has been illustrated. This mobile unit is especially well adapted for field usage in inductively welding sections of pipeline to each other, and, because of its provisions for blanketing the weld area with an inert gas, it is especially well adapted for use in welding tubular sections of readily oxidizable metals which have been prepared for such welding in accordance with the present invention.

Referring now to the apparatus schematically depicted in FIG. 2, a pair of the tubular sections 12 which have had their end portions 10 sheathed with a protective metallic composition as described above are placed with their end portions 10 in abutting relation. This relationship is maintained by means of a suitable jig 42 which grips the tubular section 12 and forces the end portions 10 into contact with each other. The work coil 44 of the high frequency induction welding unit is placed around the tubular sections 12 and is disposed adjacent their contacting end portions 10. The work coil 44 is connected to the output transformer 46 of the induction welding unit, and the transformer is, in turn, connected to a high frequency power generator (not shown) by means of electrical lead 48. A pair of annular, perforated tubular applicators 50 are positioned adjacent, and on opposite sides of, the work coil 44 around the tubular sections 12. The perforations of these annular tubular applicators 50 are positioned so that an inert gas passed into the applicators under pressure will be ejected through the perforations and will impinge against the end portions 10 of the tubular sections 12.

Before, or simultaneously with, the energization of the work coil 44, a pressurized inert gas, such as argon, helium, neon, or the like, is introduced into the applicators 50 to blanket the end portions 10 of the tubular members with the inert gas and to exclude the atmospheric gases therefrom. As the tubular sections 12 are inductively heated by the work coil 44, the protective sheathing on the end portions 10 softens and ultimately runs downwardly therefrom as the melting point of the metallic composition of the sheathing is reached. When a solder is utilized as the metallic composition, it will generally commence to liquefy and run off the end portions 10 at temperatures in the range of from 260° F. to 750° F., depending upon the solder alloy which is used. The higher the temperature induced in the end portions 10 of the tubular sections 12, the less viscous becomes the metallic composition in the sheath until all of this material runs easily off of the surface of the end portions. At this time, the blanketing of the weld area with inert gas is being continued so that there is no opportunity for the clean surfaces of the end portions 10 to come into contact with the oxygen of the atmosphere.

Ultimately, of course, the welding temperature of the particular metal of which the tubular sections 12 are constructed will be reached. The inductive welding technique presents the advantage of building up a metal bead around the outer periphery of the joint without a corresponding bead being formed on the inner periphery of the joint, thereby preserving the internal diameter of the pipeline at its full, original size. Moreover, with the inductive welding procedure, the problem of slag removal is eliminated and no extraneous weld metals are introduced to alter the pipe's metallurgical properties.

From the foregoing description, it will be apparent that the present invention provides a striking improvement in the facility with which oxidizable metals may be welded to each other, or to other metals, particularly in situations such as field welding where prevention of exposure to atmospheric contact is particularly difficult. The apparatus required for practicing the invention is relatively inexpensive to construct and simple to operate so that the process may be performed by relatively unskilled personnel without loss of adavntage. It is also believed that the cleaning and protective sheathing techniques of the invention will permit many readily oxidizable metals to enjoy a greater utility and variety of adaptation than has previously been possible with such metals.

A number of changes and variations in the exemplary apparatus described herein for performing the invention will occur to those skilled in the art and it is to be noted that the apparatus, per se, does not constitute a part of the invention. However, the broad principles of the process herein described are deemed by me to constitute the foundation of the invention and all modifications and innovations of process conditions which do not depart from the employment of these principles are considered to fall within the spirit and scope of the invention as defined by the following claims.

I claim:

1. The method of joining a first metallic member to a second metallic member which is susceptible to substantially instantaneous surface reaction with atmospheric elements which comprises:

cleaning a part of the surface of said second metallic member to remove the reaction product of said surface reaction;

coating the cleaned surface of said second metallic member with a metal which has a melting point substantially lower than the melting point of said metallic members and which is a solid at ambient temperatures to protect the cleaned surface from contact with the atmosphere;

placing said first and second metallic members in an environment of inert gas with said first metallic member in contact with the metal coated portion of said second metallic portion; and joining said first and second metallic members to each other at their point of contact in said inert gas by a joining process entailing the application to said second metallic member of sufficient heat to liquefy said coating metal whereby said metal will gravitate from said second metallic member, exposing a fresh clean surface.

2. The method of joining a first metallic member to a second metallic member which is susceptible to instantaneous surface reaction with atmospheric elements which comprises:

immersing the portion of said second metallic member which is to be joined to said first metallic member in a molten metallic composition having a lower melting point than the temperatures obtained in the welding processes ordinarily used for joining said first and second metallic members;

cleaning the surface of said immersed portion to remove the surface coating produced by said surface reaction;

lowering the temperature of the metallic composition in contact with the cleaned surface of said second metallic member to solidify the metallic composition on said second metallic member and form a coating thereon;

placing the portions of said first and second metallic members which are to be joined in an inert atmosphere in abutting contact with each other; and welding said members to each other through said inert atmosphere-surrounded portions.

3. The method of preparing aluminum pipe sections for joining to each other by welding in the field which comprises:

immersing the ends of the aluminum pipe sections which are to be joined to each other in a molten metallic composition having a lower melting point than the temperature developed in the aluminum-welding process to be used;

cleaning the surfaces of the immersed ends of the aluminum to remove the oxide coating therefrom while said ends remain immersed; and solidifying the metallic composition on the cleaned surfaces of the aluminum to form a protective coating thereon.

4. The method of constructing pipeline from sections of aluminum and aluminum alloy pipe which comprises:

immersing the ends of the pipe sections in a molten metallic composition having a lower melting point than 850° F. which is characterized by being solid at ambient temperatures;

cleaning the surfaces of the immersed ends of the pipe sections to remove the surface coating of oxide therefrom;

cooling the metallic composition in contact with said cleaned surfaces to solidify the metallic composition on the ends of said pipe sections;

placing the pipe sections in end-to-end abutting relation at the location where the pipeline is to be constructed;

displacing atmospheric gases from around the coated pipe section ends by directing a stream of heavy, inert gas over and around the pipe section ends; and welding the ends of said pipe sections to each other while said ends are subjected to the impingement of said inert gas.

5. The method claimed in claim 4 wherein said metallic composition is an aluminum solder.

6. A pipe section for the construction of pipeline comprising a tubular member constructed of a metallic material selected from the group consisting of aluminum and aluminum alloys; a thin coating of the oxide of said metallic material covering the outer periphery of said tubular member between points spaced axially along said tubular member from each end thereof; and a coating of a metallic composition having substantially less tendency to oxidize than aluminum, a melting point below 850° F. and a solidifying point above ambient temperature on the ends of said tubular member and in abutting contact with the oxide-free surface of said tubular member.

References Cited in the file of this patent

UNITED STATES PATENTS

| | | |
|---|---|---|
| 2,649,527 | Chapman et al. | Aug. 18, 1953 |
| 2,892,914 | Rudd | June 30, 1959 |
| 2,977,675 | Simms | Apr. 4, 1961 |
| 2,995,814 | Chamness | Aug. 15, 1961 |